United States Patent [19]

Dey

[11] Patent Number: 5,004,337

[45] Date of Patent: Apr. 2, 1991

[54] MODIFIED FOUCAULT FOR TESTING AN IMAGING DEVICE IN TERMS OF THE ENCIRCLED ENERGY TEST

[75] Inventor: Thomas W. Dey, Springwater, N.Y.

[73] Assignee: Eastman Kodak Company, Rochester, N.Y.

[21] Appl. No.: 531,988

[22] Filed: May 31, 1990

[51] Int. Cl.$^5$ .............................................. G01B 9/00
[52] U.S. Cl. ..................................... 356/124; 350/266
[58] Field of Search ............... 356/124, 125, 126, 127; 350/266

[56] References Cited

U.S. PATENT DOCUMENTS

| | | |
|---|---|---|
| 4,160,598 | 7/1979 | Firester et al. ........................ 356/121 |
| 4,272,190 | 6/1981 | Shapiro ................................ 356/124 |
| 4,402,602 | 9/1983 | Kuppenheimer, Jr. ............. 356/124 |
| 4,487,502 | 12/1984 | Fantozzi et al. . | |

FOREIGN PATENT DOCUMENTS

| | | | |
|---|---|---|---|
| 139043 | 8/1983 | Japan ..................................... 356/125 |
| 1288497 | 2/1987 | U.S.S.R. ............................... 356/124 |

Primary Examiner—F. L. Evans
Attorney, Agent, or Firm—Stephen C. Kaufman

[57] ABSTRACT

A novel method for quantitatively assessing an imaging device in terms of the classical encircled energy test. The method of the present invention provides this capability by a novel adaptation of the Foucault knife-edge test. In this way, the inherent advantages of the traditional qualitative Foucault knife-edge test are preserved. At the same time, the novel method provides a quick and efficient pass/fail test for quantitatively ascertaining exactly what percentage of energy may be sharply imaged by an imaging device.

5 Claims, 10 Drawing Sheets

MODIFIED FOUCAULT FOR TESTING AN IMAGING DEVICE IN TERMS OF THE ENCIRCLED ENERGY TEST

CROSS REFERENCE TO RELATED APPLICATIONS

This application is related to U.S. application Ser. No. 07/464,278 filed Jan. 12, 1990, by Vandenberg et al; to U.S. application Ser. No. 07/464,042 filed Jan. 12, 1990 by Pitek et al; to U.S. application Ser. No. 07/485,413 filed Feb, 27, 1990 by Dey et al; to U.S. application Ser. No. 07/485,182 filed Feb. 27, 1990 by Humbel et al; to U.S. application Ser. No. 07/496,732 filed Mar. 21, 1990, by Vandenberg et al; to U.S. application Ser. No. 07/500,640 filed Mar. 28, 1990, by Humbel et al; and, to U.S. application Ser. No. 07/531,202 filed May 31, 1990 to Dey, which is being filed contemporaneously with this application. The entire disclosures of each of these applications are incorporated by reference herein. Each of these applications is copending and commonly assigned.

FIELD OF THE INVENTION

This invention relates to a method for testing an imaging device.

INTRODUCTION TO THE INVENTION

As disclosed in the above referenced applications, a Foucault knife-edge test has been traditionally understood to be perhaps the classic optical test for an imaging device, for example, a lens or a mirror.

Figure 1:
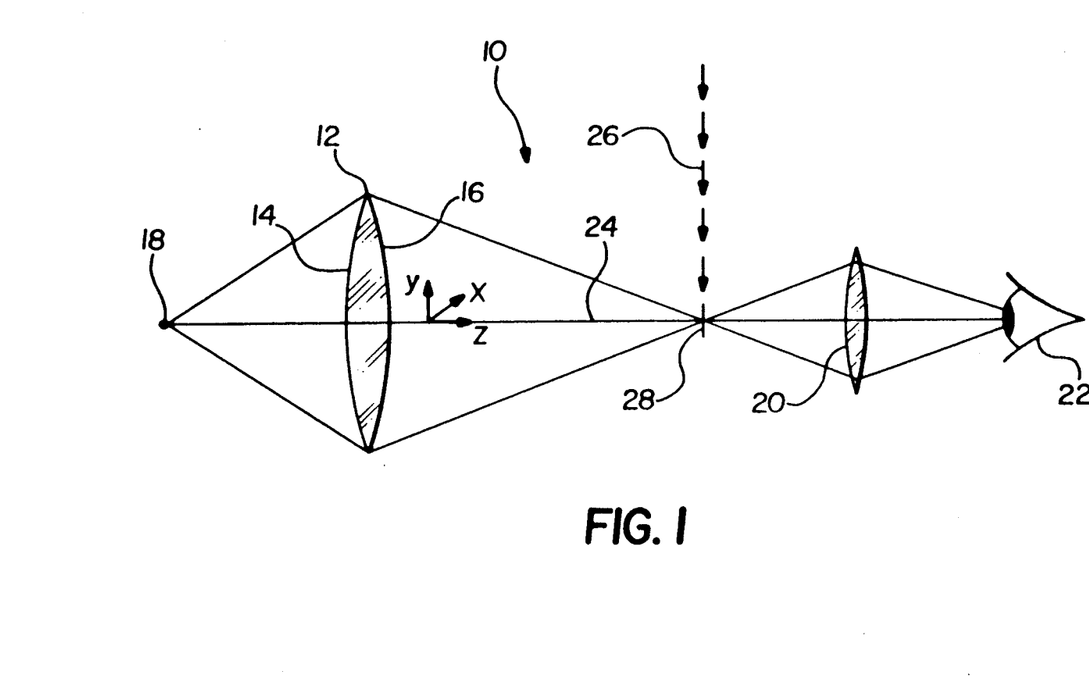
FIG. 1 shows an optical assembly for using the Foucault knife-edge test.

Attention is directed to FIG. 1, which shows a typical optical assembly 10 for demonstrating the basic principles of the Foucault knife-edge test. The assembly 10 includes a conventional imaging device, i.e., a lens 12, the lens 12 comprising a pair of optical surfaces 14 and 16; a radiation source 18; a collector lens 20; and a conventional photodetector 22 comprising the human eye. The components of the assembly 10 are aligned to a reference axis 24, as further evidenced by an x, y, z coordinate system.

For this optical assembly 10, one may employ the knife-edge test for qualitatively detecting (at the eye/photodetector 22) the presence of transverse aberrations that may have been introduced into the assembly 10 by the lens optical surfaces 14, 16. Accordingly, a knife-edge 26 may be gradually introduced into the assembly 10 (shown by way of the FIG. 1 staggered arrows), so that the knife-edge 26 sequentially cuts or blocks the image of the radiation source 18 at a plane of convergence 28. This action, in turn, removes source rays from their expected trajectories, so that a variable intensity pattern may be registered by the eye. Finally, a comparison of this intensity pattern with a theoretical intensity pattern for an ideal optical surface, can become a qualitative measure of the presence of transverse aberrations introduced by the optical surfaces 14, 16.

SUMMARY OF THE INVENTION

So far, we have stressed that the Foucault knife-edge test can provide a qualitative measure of the presence of transverse aberrations that may have been introduced by the imaging device 12. Attention is now directed to FIGS. 2 and 3, which figures help explain what we mean by a qualitative test.

Figure 2A:
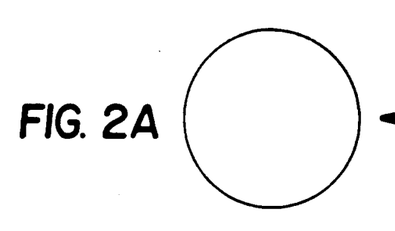
FIGS. 2A–D show shadow patterns generated by an ideal imaging device undergoing the FIG. 1 knife-edge test.
Figure 2B:
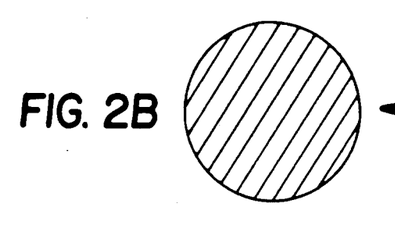
Figure 2C:
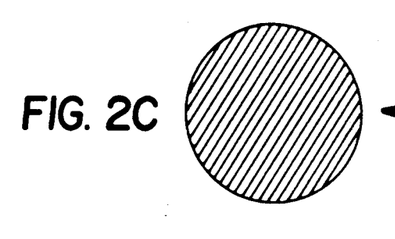
Figure 2D:
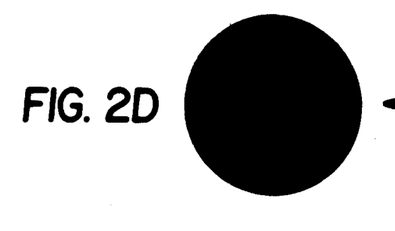

In particular, FIGS. 2A, B, C, D show, in sequence, what the eye can qualitatively perceive when an ideal imaging device is subjected to the Foucault knife-edge test, and the knife-edge is sequentially advanced through four successive knife-edge positions viz:

FIG. 2A: knife-edge position 1 = total non-occlusion of the radiation (no shadow);

FIG. 2B: knife-edge position 2 = partial occlusion of the radiation (light, uniform shadowing);

FIG. 2C: knife-edge position 3 = further occlusion of the radiation (darker, uniform shadowing);

FIG. 2D: knife-edge position 4 = total occlusion of the radiation (total shadow).

In summary, FIGS. 2A-D show that, for the ideal imaging device, the eye can qualitatively perceive an ever increasing and uniform shadow pattern. We can say, moreover, that the FIG. 1 collector lens 20 can provide images of the imaging device 12 at a photodetector plane, that is, at the eye, which images are the FIGS. 2A-D shadow patterns.

Figure 3A:
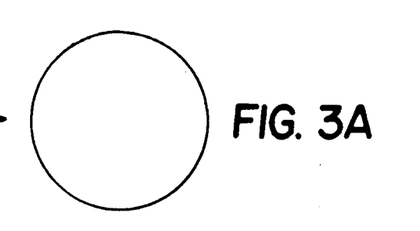
FIGS. 3A–D show shadow patterns generated by a non-ideal imaging device undergoing the FIG. 1 knife-edge test.
Figure 3B:
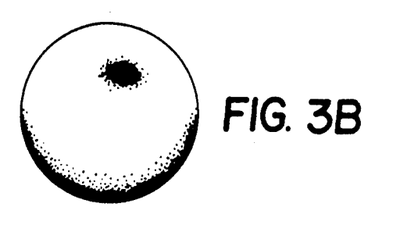
Figure 3C:
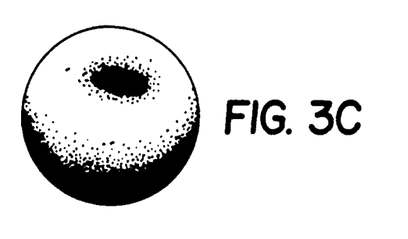
Figure 3D:
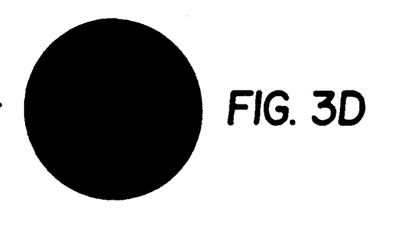

Now we turn our attention to FIGS. 3A-D, which sequentially show what the eye can qualitatively perceive when a non-ideal imaging device is substituted for the FIG. 2 ideal imaging device, and is subjected to the Foucault knife-edge test. In particular, as the knife-edge is sequentially advanced through four successive knife-edge positions, the eye can sequentially and qualitatively perceive:

FIG. 3A: knife-edge position 1 = total non-occlusion of the radiation (no shadow);

FIG. 3B: knife-edge position 2 = partial occlusion of the radiation (light, non-uniform shadowing);

FIG. 3C: knife-edge position 3 = further occlusion of the radiation (darker, more obscure shadowing);

FIG. 3D: knife-edge position 4 = total occlusion of the radiation (total shadow).

In summary, FIGS. 3A-D show that, for the non-ideal imaging device, the eye can qualitatively perceive an ever increasing shadow pattern: the FIGS. 3A-D shadow patterns, in contrast to that of FIGS. 2A-D, are marked by salients consisting of various dark zones with different radii of curvature, and different centers of curvature.

Comparing, therefore, the shadow patterns provided in FIGS. 3A-D, versus those provided in FIGS. 2A-D, one skilled in the art may be enabled to say, based upon his subjective experience, that the FIG. 3 non-ideal imaging device has introduced some transverse aberrations into the assembly 10. A skilled optician may indeed be able to say more, for example, that the FIG. 3 shadow pattern suggests that the aberration is trefoil, or quatrefoil, or astigmatism. However, the skilled optician would not be able to ascertain, based on his eye's perception of the FIG. 3D shadow pattern, what quantitative measure of the transverse ray has been introduced by the non-ideal imaging device.

As a first of two examples of this predicament, one's eye perception alone may preclude the optician from answering quantitative questions such as: how many waves of quatrefoil? or, how many waves of trefoil? etc. With reference to this first example, it has now been discovered, and disclosed in the above-referenced U.S. patent application Ser. No. 07/500,640, a quantitative Foucault knife-edge test. The test disclosed in this application complements the traditional qualitative test, by developing a quantitative interpretation of the imaging device's characteristics. An important advantage of this discovery is that the skilled optician is now enabled to quantitatively answer the questions posed above by the first example: that is, the optician can now say, "the imaging device has 0.05 waves of trefoil, or 0.75 waves of quatrefoil."

As a second example, and one not addressed by the above-referenced U.S. patent application, one's eye perception alone may preclude the optician from quantitatively assessing an imaging device in terms of what is conventionally known as an "encircled energy test". Here, the optician is asked to realize, by way of the encircled energy test, the following design specifications for an imaging device:

Example A: A desired transverse ray aberration tolerance for an imaging device is such that an energy circle of 80.0 micron diameter contains 95% of the energy imaged by the imaging device; or, Example B: A desired transverse ray aberration tolerance for an imaging device is such that an energy circle of 100.0 micron diameter contains 98% of the energy imaged by the imaging device.

The significance of the second example, as compared to the first example, includes the following. I have realized that for many practical, commercial operations, it may be a sufficient objective to know whether or not a focused beam emerging from the imaging device is within or without the energy circle. This fact alone, may be an important indicia of the imaging device's characteristics. Restated, it may be a sufficient objective, for certain applications, to know whether or not the imaging device simply passes or fails the energy circle test, in contrast to quantitatively knowing exactly how many waves of a particular aberration characterize the imaging device. Thus, if an imaging device passes, say, a 98% energy circle test, that is sufficient, and one does not care that the implicit aberration comprises, say, 0.08 waves of coma. At the same time, it would be a desirable objective to quantitatively know exactly what percentage of energy is imaged by the imaging device (pass or fail), and to know this by a quick and efficient testing procedure.

I have now discovered a novel method for quantitatively assessing an imaging device in terms of the encircled energy test. The novel method of the present invention provides this capability by a novel adaptation of the Foucault knife-edge test. In this way, the inherent advantages of the traditional qualitative Foucault knife-edge test are preserved. At the same time, the novel method secures the objectives listed above: it provides a quick and efficient pass/fail test for quantitatively ascertaining exactly what percentage of energy may be imaged by an imaging device.

The present invention, accordingly, provides a method suitable for testing a specified transverse ray aberration tolerance in an imaging device, as indicated by the encircled energy test. The imaging device is tested in a modified Foucault knife-edge test assembly. The assembly comprises:

(a) an imaging device to be tested;

(b) a source of radiation energy that can be directed along a reference axis to the imaging device;

(c) a photodetector aligned on the source reference axis, for detecting and measuring the radiation energy imaged by the imaging device; and (d) a knife-edge capable of being positioned in a series of knife-edge position steps, for cutting the radiation imaged by the imaging device, thereby producing a variable radiation energy function, as measurable by the photodetector, the knife-edge comprising a substrate comprising an opaque region.

The novel method comprises the steps of:

(1) normalizing radiation energy levels of the assembly;

(2) positioning the knife-edge opaque region in three degrees of freedom, for reducing the radiation energy measured by the photodetector;

(3) positioning the knife-edge opaque region in three degrees of freedom, until the photodetector measures a minimum radiation energy; and (4) comparing the step 3 minimum energy against a test specification value.

The present invention, as defined, has a significant signal to noise (S/N) ratio advantage over a method that utilizes, for example, a pin-hole device of radius R. This advantage may be highlighted by way of FIG. 4.

Figure 4:
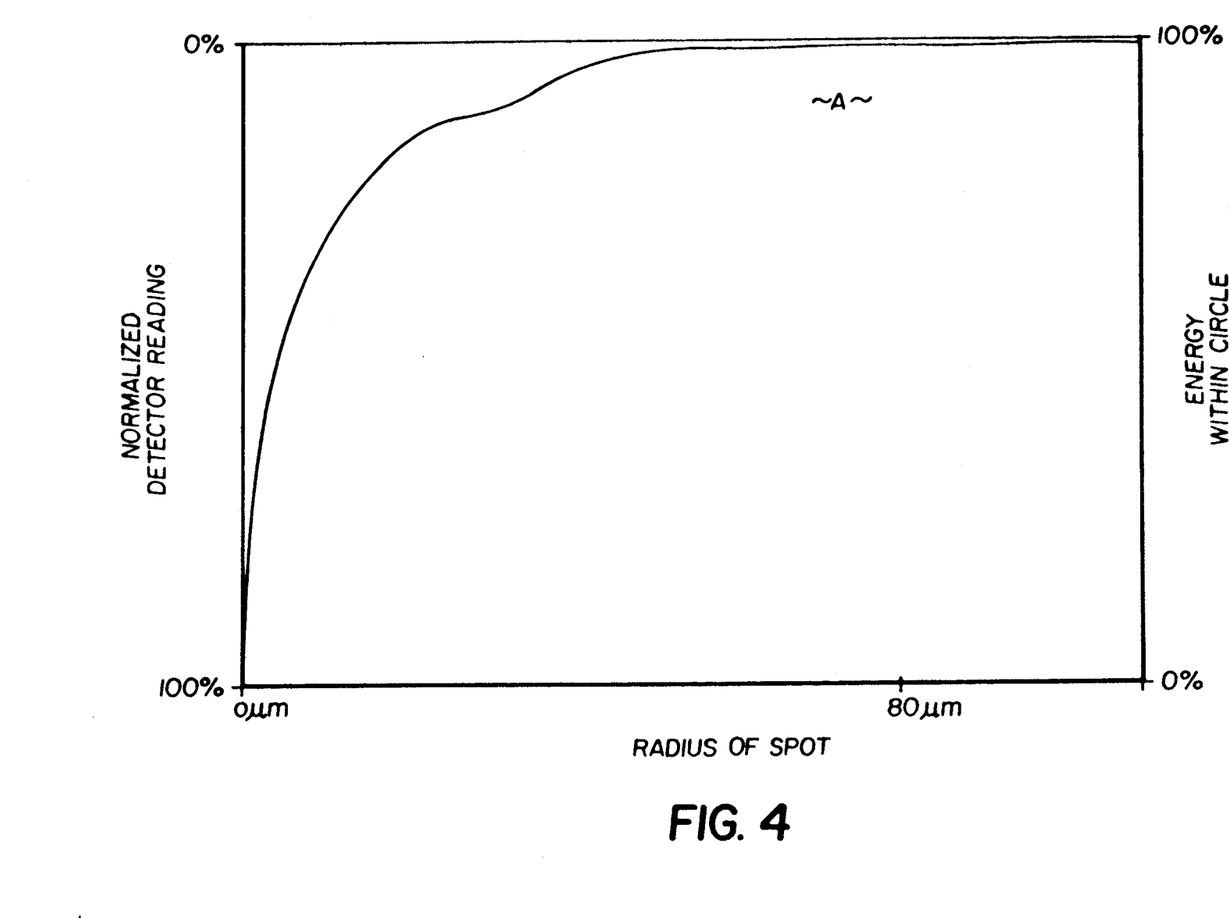
FIG. 4 shows a photon flux curve that may be analyzed to illustrate an advantage of the method of the present invention over a method using a pin-hole device.

FIG. 4 shows, for a typical imaging device to be tested, a percentage of energy (photon flux) measurable by the photodetector, when using a knife-edge to quantify the encircled energy for a high-resolution optical system.

FIG. 4 demonstrates that the pin-hole device may yield highly inaccurate measurements in a critical region of interest (A), due to a poor S/N ratio, whereas my knife-edge comprising an opaque region, can yield highly accurate measurements, because of a good S/N ratio.

For example, given a specified transverse ray aberration tolerance of 99%, and appreciating that the combined noise level of the radiation source and photodetector in the region of interest (A) may influence a true signal by e.g., $\frac{1}{2}$ of 1%, then:

For the pin-hole device: the accuracy is $99\% \pm 0.99 \times 0.5\% = 99\% \pm 0.5\%$;

For the novel method knife-edge: the accuracy is $99\% \pm 0.01 \times 0.5\% = 99\% \pm 0.005\%$.

This example demonstrates that, for these specifications, the novel method is 100 times more accurate than the method employing the pin-hole device.

BRIEF DESCRIPTION OF THE DRAWING

The invention is illustrated in the accompanying drawing, in which.

DETAILED DESCRIPTION OF THE INVENTION

As summarized above, the method of the present invention requires a knife-edge comprising a substrate, the substrate comprising an opaque region. Preferably, the knife-edge comprises a transparent substrate, and a coating material that can adhere to at least a portion of the transparent substrate, thereby forming the opaque region.

The transparent substrate of the present invention preferably has a high precision plano-shape, i.e., a flat shaped configuration, e.g., flat to within 0.1 micron over the area which is coated by the coating material. The transparent substrate preferably comprises a conventional glass. It may, alternatively, comprise a conventional plastic, or an equivalent transparent material, and one that is substantially self-supporting. A suitable transparent substrate has an index of transmittance that distinguishes it from a metal, for example, a transmittance preferably greater than 10 percent.

An advantage of the present invention is that the thickness of the transparent substrate may be variable, but, for example, for a glass substrate, is preferably from 0.5 mm to 5 mm in thickness. Further, the transparent substrate may have, for example, a circular, square or trapezoidal shape, but preferably defines a rectangular shape, the latter preferably having dimensions of approximately 3 to 50 mm length, by 3 to 50 mm width.

The coating material of the present invention preferably is such that, in combination with the transparent substrate and the source of radiation, at least one portion of a knife-edge element may be defined that qualitatively differentiates a substantially opaque region from a substantially transparent region. Restated, the transmittance of the substantially opaque region in ratio to the transmittance of the substantially transparent region, is preferably less than 10 percent. To this end, the coating material preferably comprises silver, or chrome, or aluminum, or conventional paints, or combinations of these coating materials.

A particularly preferred coating material comprises a conventional photoemulsion. This material is preferred because (1) it provides a desired opacity for a typical employment of the Foucault method, (2) it inherently and readily adheres to a typical transparent substrate, for example, glass, and (3) it has a preferred coating thickness, typically less than 10 microns.

On this last point, thickness, the coating material preferably has a thickness less than 25 microns, especially less than 0.25 microns. Control of the thickness of the coating material directly translates into the "sharpness" of the knife-edge, hence directly translating into an enhanced Foucault method accuracy A selected coating material can adhere to the transparent substrate either indirectly, as in paints, or inherently by way of conventional adhesion processes including, for example, the conventional high vacuum evaporative processes, or sputtering processes, or chemical vapor deposition processes.

As indicated above, the coating material can adhere to at least a portion of the transparent substrate, thereby forming the opaque region. The pattern adhesion may be realized by way of conventional mask techniques, or lithographic film or plate techniques. A preferred technique employs conventional photographic techniques, for example, photolithographic films and plates.

Figure 5A:
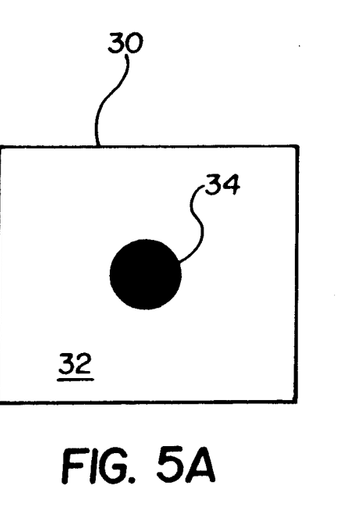
FIGS. 5A–C show preferred knife-edges of the present invention.
Figure 5B:
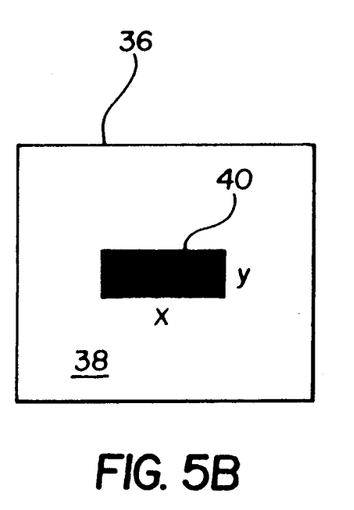
Figure 5C:
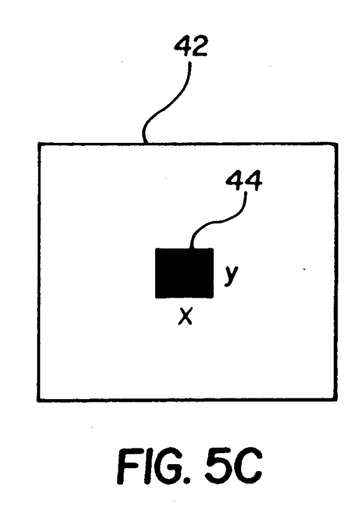

Attention is now directed to FIGS. 5A-C, which show preferred knife-edge opacity regions of the present invention, and suitable for employment in the Foucault method.

FIG. 5A shows a knife-edge 30. The knife-edge 30 comprises a white crown glass substrate 32, and an opacity region comprising a coating material 34 comprising blue chrome. The transition from opacity to transparency is abrupt, that is, the transmittance of the opaque region in ratio to the transmittance of the transparent region, is 0.01 percent. The thickness of the coating material 34 is 500 angstroms. The FIG. 5A knife-edge opacity region is meant to represent an energy circle of approximately 80.0 microns diameter. The diameter of other circular energy circles (not shown) is typically from 1.0 micron to 200.0 microns. The circle geometry is preferred when the total transverse ray aberration of an imaging device is specified, independent of the FIG. 1 x and y coordinates.

The FIG. 5B embodiment shows a knife-edge 36. The knife-edge 36 comprises a white crown glass substrate 38, and an opacity region comprising a coating material 40 comprising photoemulsion. The coating material 40 adheres to the glass substrate 38 by way of an evaporative process. The transition from opacity to transparency is abrupt, and the coating material is several microns in thickness. The FIG. 5B knife-edge opacity region comprises an energy rectangle having a length of 100.0 microns and a width of 40.0 microns. The energy rectangle geometry is preferred when the FIG. 1 x and y transverse ray aberrations are specified, and they are separate and unequal.

Attention is next directed to FIG. 5C, which shows a knife-edge 42 formed in substantially the same way as FIG. 5B, but comprising an opacity region 44 in the form of an energy square having sides of length 70.0 microns. This geometry is preferred when the x and y transverse ray aberrations are specified separately, to the same tolerance.

Figure 6:
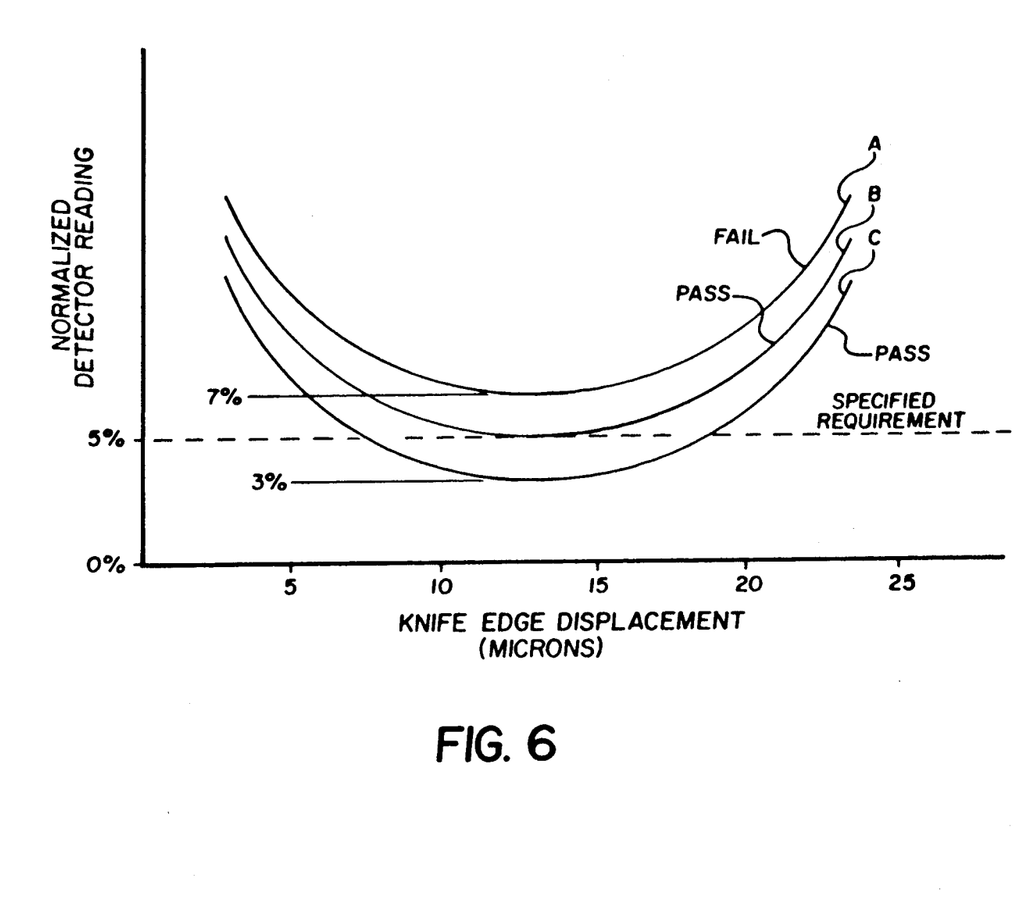
FIG. 6 shows curves indicative of the pass/fail status of an imaging device, generated in accordance with the method of the present invention.

For the sake of illustration, the FIG. 5A knife-edge 30 comprising a circular opaque geometry, is now used to demonstrate preferred aspects of the steps of the method of the present invention, for each of three imaging devices to be tested. FIG. 6 develops this point, for the following common specification:

Specification For FIG. 6: A desired transverse ray aberration tolerance for an imaging device is such that an energy circle of 80.0 micron diameter contains 95% of the energy imaged by the imaging device.

FIG. 6 shows the three possible curves that can be generated in accordance with the method of the present invention, for each of three different imaging devices, i.e., the first imaging device fails (curve A); the second imaging device meets specification (curve B); the third imaging device exceeds specification (curve C).

For the FIG. 6 third imaging device that exceeds specifications (curve C), its curve may be generated in accordance with the following four steps.

Step 1: Normalizing radiation levels of the Foucault Assembly.

Figure 7:
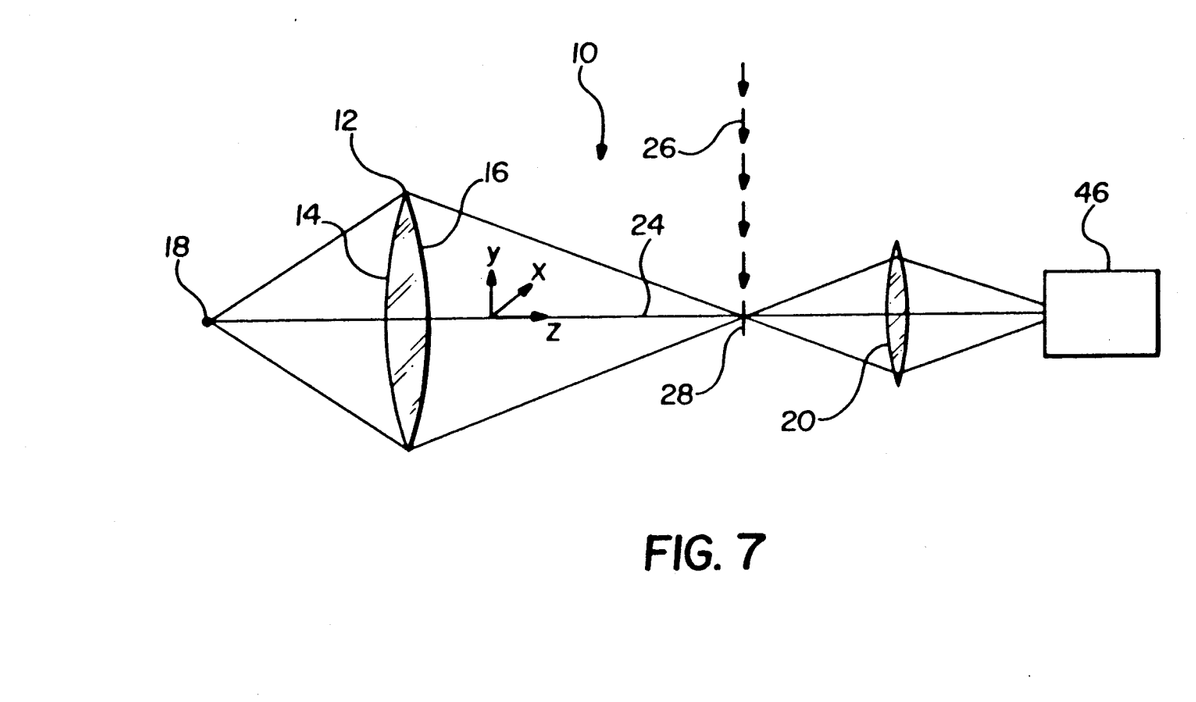
FIG. 7 shows the basic elements of the FIG. 1 optical assembly, as modified in accordance with the requirements of the present invention.

Step 1 is preferably realized by way of a modified FIG. 1 optical assembly 10, of the type shown in FIG. 7. To this end, the FIG. 1 photodetector 22 comprising the human eye, is preferably replaced by an electro-optical (E-O) photodetector, for example, a United Detector Technology Model 161 Optometer, as shown in FIG. 7 as numeral 46. The FIG. 7 E-O photodetector 46 may be normalized (in the presence of the FIG. 7 imaging device 12) by making two separate photodetector readings, namely, (1) with a mask or knife-edge opaque region completely blocking the radiation passing through the imaging device 12 from the source 18 to the E-O photodetector 46; and, (2) with the knife-edge transparent portion allowing substantially all of the radiation source 18 energy to reach the E-O photodetector 46. These two readings comprise first and second endpoints, demarking 0 to 100% normalization.

Step 2: Positioning the knife-edge opaque region in three degrees of freedom, for reducing the radiation energy measured by the photodetector.

Figure 8A:
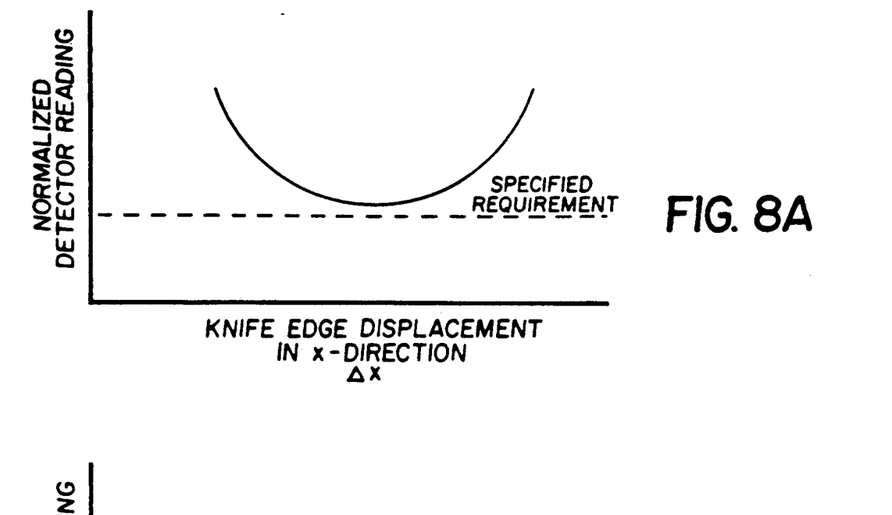
FIGS. 8A–C show cyclic descent optimization curves generated in accordance with a Step 2 of the present invention, for the case of a "Passed" imaging device.
Figure 8B:
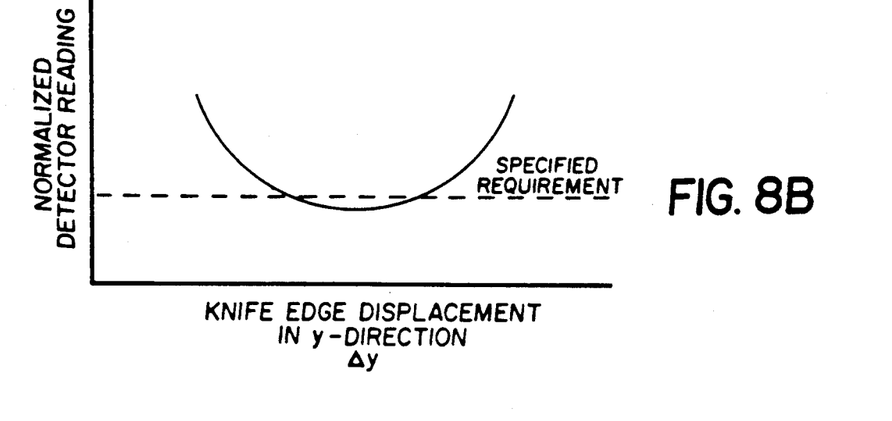
Figure 8C:
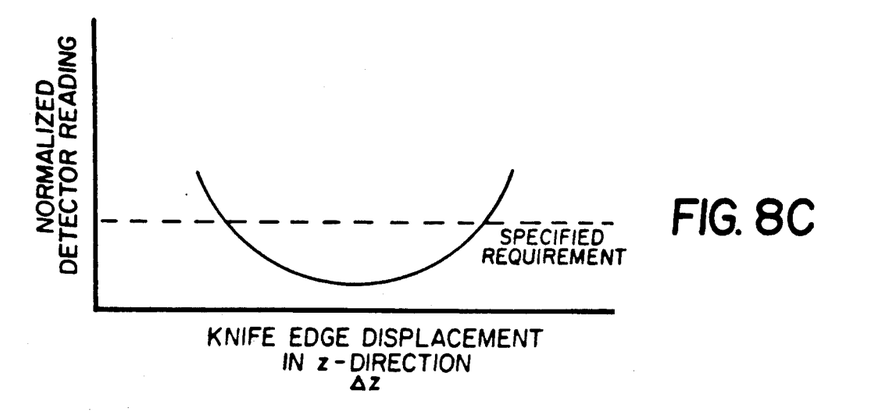

Step 2 is preferably realized in the following way. The knife-edge comprising the opaque region may be positioned in three degrees of freedom $\Delta x$, $\Delta y$, $\Delta z$ (see FIG. 7's coordinate system), for reducing the radiation energy measured by the photodetector 46. Such a positioning of the knife-edge initiates a process comprising cyclic descent optimization, to the end of minimizing the photodetector energy reading. An example of the cyclic descent optimization is shown in FIG. 8A-C. Note that each of the coordinates $\Delta x$, $\Delta y$, $\Delta z$ is individually optimized unto itself.

Step 3: Positioning the knife-edge opaque region in three degrees of freedom, until the photodetector measures a minimum energy.

Figure 9A:
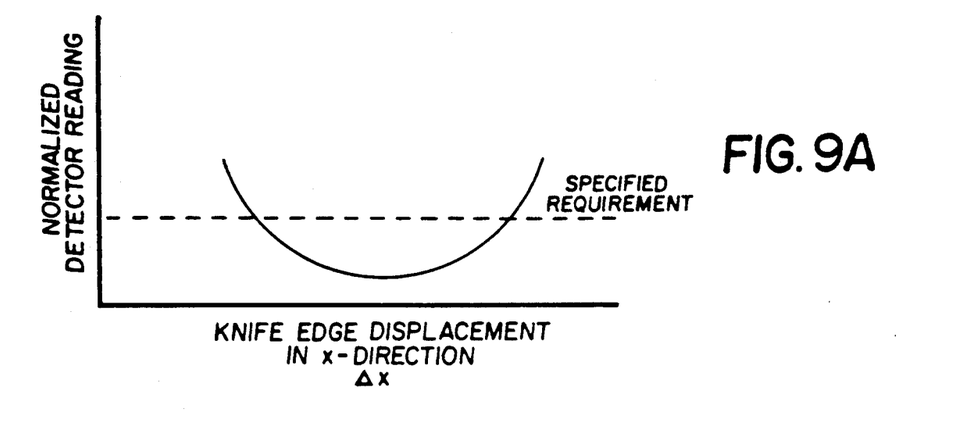
FIGS. 9A–C show cyclic descent optimization curves generated in accordance with a Step 3 of the present invention, for the case of a "Passed" imaging device.
Figure 9B:
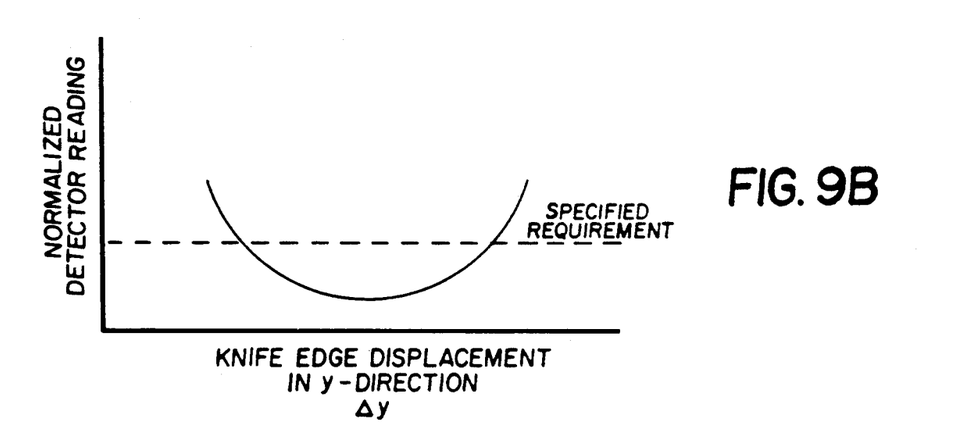
Figure 9C:
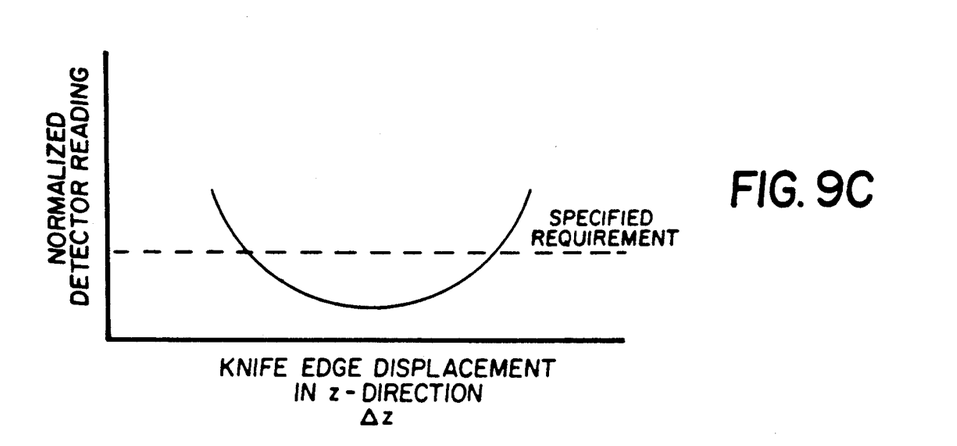

Step 3 corresponds to a continuation of the Step 2 cyclic descent optimization process. That is, the knife-edge opaque region is further positioned for gradual increments of $\Delta x$, $\Delta y$, $\Delta z$, until the photodetector 46 now measures a minimum, quantified energy. FIGS. 9A-C provide examples of Step 3, for each of the coordinates $\Delta x$, $\Delta y$, $\Delta z$, respectively. Note that although each of the coordinate movements $\Delta x$, $\Delta y$, $\Delta z$, is individually optimized unto itself, the final descent to a minimum energy is such that the photon energy intensity measured by the photodetector 46, for each of the coordinates $\Delta x$, $\Delta y$, $\Delta z$, is the same.

Step 4: Comparing the Step 3 minimum energy against a test specification value.

Step 4 may be explained by reference to FIGS. 9A-C. These figures show that the minimum energy measured by the photodetector 46 is less than the specification value. The imaging device being tested, accordingly, exceeds the specification line poised above with reference to FIG. 6 (curve C). This imaging device therefore passes the encircled energy test.

Figure 10A:
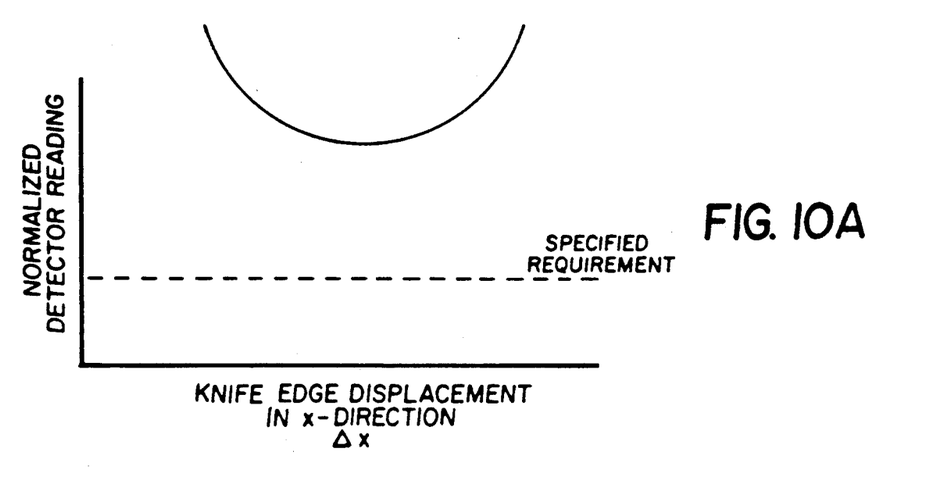
FIGS. 10A-C show cyclic descent optimization curves generated in accordance with a Step 2 of the present invention, for the case of a "Failed" imaging device.
Figure 10B:
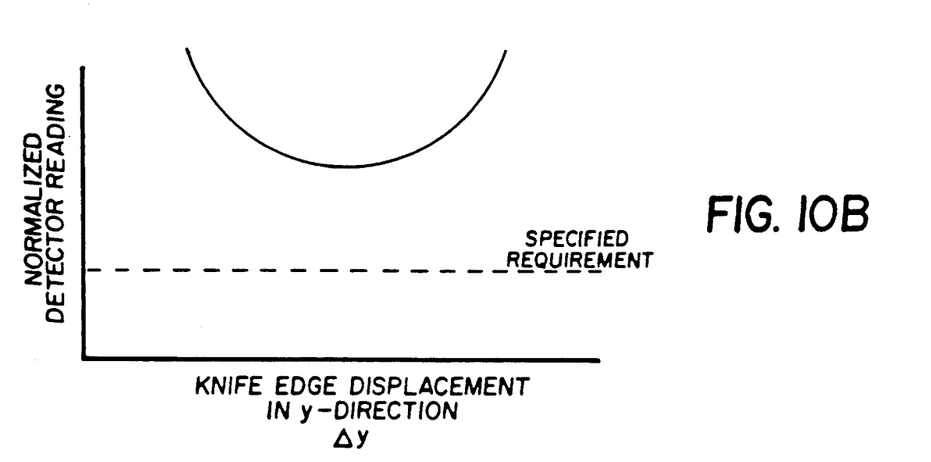
Figure 10C:
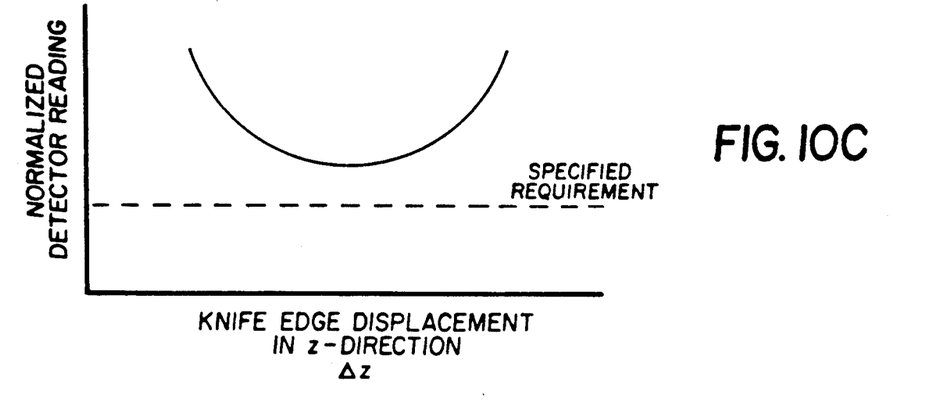
Figure 11A:
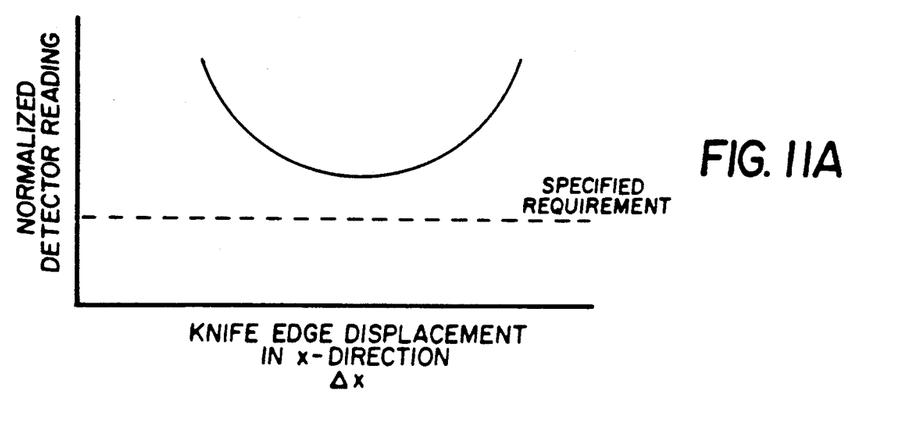
FIGS. 11A-C show cyclic descent optimization curves generated in accordance with a Step 3 of the present invention, for the case of a "Failed" imaging device.
Figure 11B:
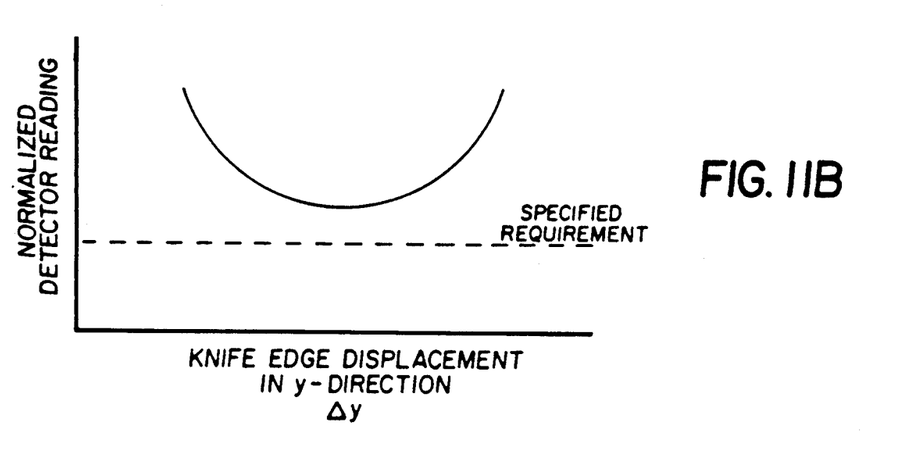
Figure 11C:
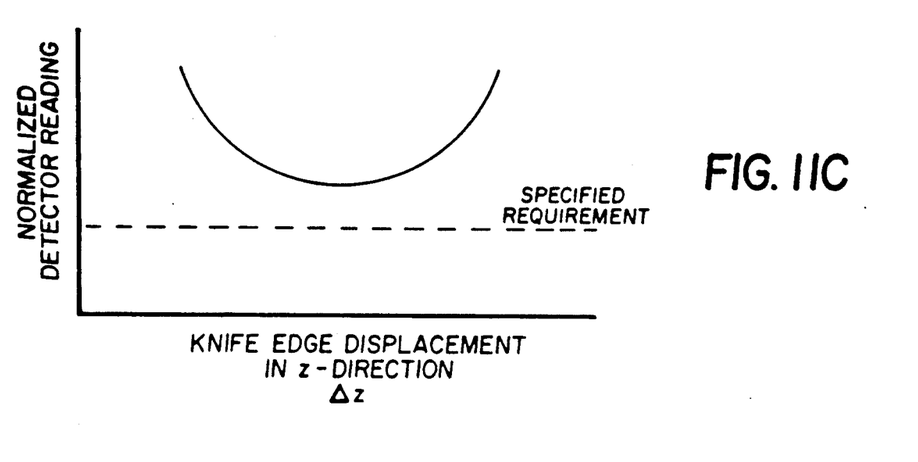

Finally, the method of the present invention is illustrated for the case where an imaging device fails a specification, as exemplified above in FIG. 6, curve A. Such an imaging device, when subjected to the second step of the method, generates a family of curves of the type shown in FIGS. 10A-C. FIGS. 10A-C show that when the knife-edge opaque region is moved in three degrees of freedom, the photodetector 46 generates energy curves, for each of the coordinate movements $\Delta x$, $\Delta y$, $\Delta z$, above the specification line. Further, Figs. 11A-C show that when the knife-edge is further positioned in accordance with the Step 3 of the method, so as to generate a minimum photodetector 46 energy of known intensity, the minimum remains above the specification line, for each of the coordinate movements $\Delta x$, $\Delta y$, $\Delta z$. This last fact demonstrates that the imaging device fails the specification, i.e., the encircled energy test.

I claim:

1. A method suitable for testing a specified transverse ray aberration tolerance in an imaging device, the imaging device being tested in a modified Foucault knife-edge test assembly, which assembly comprises:
   (a) an imaging device to be tested;
   (b) a source of radiation energy that can be directed along a reference axis to the imaging device;
   (c) a photodetector aligned on the source reference axis, for detecting and measuring the radiation energy imaged by the imaging device; and
   (d) a knife-edge capable of being positioned in a series of knife-edge position steps, for cutting the radiation imaged by the imaging device, thereby producing a variable radiation energy function, as measurable by the photodetector, the knife-edge comprising a substrate comprising an opaque region;

the method comprising the steps of:
   (1) normalizing energy radiation levels of the assembly;
   (2) positioning the knife-edge opaque region in three degrees of freedom, for reducing the radiation energy measured by the photodetector;
   (3) positioning the knife-edge opaque region in three degrees of freedom, until the photodetector measures a minimum radiation energy; and
   (4) comparing the step 3 minimum energy against a test specification value.

2. A method according to claim 1, wherein the steps (2) and (3) comprise positioning a knife-edge comprising a circular opaque region.

3. A method according to claim 2, wherein the steps (2) and (3) comprise positioning a knife-edge comprising a circular opaque region, the circle having a diameter from 1.0 micron to 200.0 microns.

4. A method according to claim 1, wherein the steps (2) and (3) comprise positioning a knife-edge comprising a rectangular opaque region.

5. A method according to claim 1, wherein the steps (2) and (3) comprise positioning a knife-edge comprising a square opaque region.

* * * * *

UNITED STATES PATENT AND TRADEMARK OFFICE
CERTIFICATE OF CORRECTION

PATENT NO. : 5,004,337
DATED : April 2, 1991
INVENTOR(S) : Thomas W. Dey

It is certified that error appears in the above-identified patent and that said Letters Patent is hereby corrected as shown below:

ON TITLE PAGE:

In The Title  Delete "MODIFIED FOUCAULT FOR TESTING AN IMAGING DEVICE IN TERMS OF THE ENCIRCLED ENERGY TEST" and substitute therefor --MODIFIED FOUCAULT METHOD FOR TESTING AN IMAGING DEVICE IN TERMS OF THE ENCIRCLED ENERGY TEST--;

Col. 1, lines 2-4  Delete "MODIFIED FOUCAULT FOR TESTING AN IMAGING DEVICE IN TERMS OF THE ENCIRCLED ENERGY TEST" and substitute therefor --MODIFIED FOUCAULT METHOD FOR TESTING AN IMAGING DEVICE IN TERMS OF THE ENCIRCLED ENERGY TEST--.

Signed and Sealed this

First Day of September, 1992

Attest:

DOUGLAS B. COMER

*Attesting Officer*    *Acting Commissioner of Patents and Trademarks*